Patented Apr. 14, 1953

2,635,057

UNITED STATES PATENT OFFICE 2,635,057

PELLETIZED CARBON BLACK AND PROCESS OF MAKING

Merrill E. Jordan, Walpole, Mass., assignor to Godfrey L. Cabot, Inc., Boston, Mass., a corporation of Massachusetts No Drawing. Continuation of abandoned application Serial No. 736,409, March 21, 1947. This application February 6, 1952, Serial No. 270,285

4 Claims. (Cl. 106—307)

This invention consists in a new carbon black product in pelletized form having an important field of use in the manufacture of news ink. The pellets contain a surface active agent which is effective in two respects, that is to say, as an emulsifier and as a dispersing agent for carbon black. Carbon black in this pelletized form has the characteristic of easy dispersion in news ink, a high degree of color development, and a low levigation factor.

For many years there has been a demand for a pelletized dustless carbon black which could be readily dispersed by ordinary milling equipment in commercial news ink vehicles. Carbon black pelletized or spheronized by dry processes disperses poorly in such media. Carbon black pelletized by wet processes, with or without dispersing agents, is not entirely satisfactory in its dispersion action. Attempts have been made to pelletize carbon black with oil or with news ink vehicles as a pelletizing medium, but an objectionably high oil concentration has been found necessary in order to ensure even reasonably good dispersion. None of the prior attempts above discussed has resulted in a satisfactory color development.

I have discovered that by pelletizing carbon black with a uniformly distributed surface active constituent comprising an unsaturated fatty acid combined with an amine, a product is produced which will disperse excellently in ordinary milling equipment and has a high degree of color development.

In the news ink industry the degree of dispersion of carbon black in oil or news ink vehicle is measured by a levigation test, that is to say, the carbon black product dispersed in an ink vehicle at a pigment concentration of 12½% must leave a maximum residue of not over 0.03% on a 325-mesh screen. The carbon black of my invention in all cases conforms to this standard.

News ink prepared with the new product of my invention shows excellent color development and is in all respects equal in flow, strike-through, viscosity and other characteristics to the highest grade of news ink heretofore known.

The product is prepared by pelletizing standard carbon black, such as an Elf type, with oil or news ink vehicle, water, and a special surface active agent of the type above identified. During the process of pelletization the surface active agent becomes intimately associated with and uniformly distributed through the carbon black; hence its effective behavior in the final product. The same reagents merely added to news ink vehicle and ordinary black, either fluffy, or pelletized by the processes previously mentioned, have little or no appreciable effect. Under such circumstances dispersion is poor and color development of a low degree.

Moisture content also plays an important part in the composition of the carbon black product of my invention. It appears to be inadvisable to go below a moisture content of 5%, for when the pellets contain less than that amount of moisture, the amount of residue tends to increase and may exceed the limiting percentage of 0.03.

The surface active reagent must comprise an unsaturated fatty acid containing at least one double bond. Among such acids are oleic, containing one double bond, linoleic acid, containing two double bonds, and eleostearic, containing three double bonds. There are other satisfactory and equivalent fatty acids of this specification but it is unnecessary to enumerate more of them. The hydrophobic tendencies of the organic acid must be balanced by a hydrophillic group which will not only be effective as an emulsifying agent but must also act effectively as a dispersing agent. The ammonium radical or substituted ammonium radicals have this property. Using the acids above enumerated, I have found that all amine esters of unsaturated fatty acids are entirely satisfactory including: ammonium oleate, ammonium linoleate, ethylenediamine linoleate, monoethylamine oleate, monoethanolamine oleate, morpholine eleostearate, morpholine oleate, piperidine oleate and morpholine supradistillate (a mixture of unsaturated fatty acids).

The oil ingredient of my pelletized product may be a mineral oil or any one of the news ink vehicle oils available on the market such, for example, the thickened mineral oil known to the industry as Morrill's F 87 oil. The pellets may be formed by dripping or spraying an emulsion of the oil upon a mass of fluffy carbon black while the latter is agitated within apparatus of the type shown in U. S. Patent No. 2,167,674, Offutt. Pellets formed by dripping into the carbon black oil which does not contain the surface active constituent of my invention require an objectionably high oil to carbon black ratio and thus entail a freight problem, since the cost of shipping the product may well exceed the cost of shipping its constituents separately. Accordingly, a very important advantage of employing a surface active constituent of the character herein disclosed is that it permits the formation of pellets with a relatively low oil to black ratio. This, it will be understood, is in addition to its further function of acting as a dispersing or wetting agent for the pellets in the news ink vehicle.

In carrying out my process, I first prepare an emulsion of water, oil and surface active ingredient. By varying the water content in the emulsion it is possible to produce pellets having a high or low oil to carbon black ratio which will disperse readily in the news ink vehicle. Pellets formed with an oil content varying from 15 to 60% have satisfactory dispersion characteristics and adequate mechanical strength to permit handling and shipping without substantial disintegration.

Pelletizing of the black may be accomplished by adding the emulsion from a tank above the agitating mechanism, for example, by causing it to flow at a pressure of approximately 20 lbs. per square inch through a 1/8" pipe perforated with holes 1/16" in diameter. When this procedure is followed the dusty black at the bottom of the agitating mechanism is drawn off and returned to the top, and this is continued until all the carbon black has been converted to substantially spherical dustless pellets. The following examples will illustrate the procedure:

*Example A*

| | Per cent |
|---|---|
| Mineral oil | 43 |
| Water | 54 |
| Oleic acid | 2 |
| Triethanolamine | 1 |

*Example B*

| | Per cent |
|---|---|
| Mineral oil | 45.1 |
| Water | 52.7 |
| Oleic acid | 1.4 |
| Triethanolamine | 0.8 |

Adding these emulsions to carbon black of the unagitated channel type, such as Elf 5, produced wet pellets of substantially the following composition:

| | Per cent |
|---|---|
| Carbon black | 40.0 |
| Oil and dispersing agents | 27.8 |
| Water | 32.2 |

The wet pellets as above provided may now be dried, for example in the Roto-Louvre drier, in accordance with the following specifications:

Rate of feed—60 lbs. wet pellets per hour
Drier rotated at —3 R. P. M.
Moisture content wet pellets—32% by weight
Air volume in—320 C. F. M.
Air temperature in—340° F.
Air temperature at exit—100° F.
Material temperature at exit—105° F.
Final moisture content—22%

While I have referred to channel black as the raw carbon black material employed in the product of my invention, it will be understood that other types of carbon black, such as furnace black, may be used with entire satisfaction. For practical purposes, the moisture content of the dried pellets may vary from 5 to 35%. Pellets having a moisture content above the latter figure tend to become soggy.

Examples of the final product in satisfactory condition for final use are as follows:

*Example C*

| | Per cent |
|---|---|
| Moisture | 22.6 |
| Oil | 31.6 |
| Black | 45.8 |
| | 100.0 |

40.9% Oil in black; 0.004% Levigation residue in ink.

*Example D*

| | Per cent |
|---|---|
| Moisture | 9.6 |
| Oil | 33.6 |
| Black | 56.8 |
| | 100.0 |

37.2% Oil on black; 0.008% Levigation residue in ink

In the foregoing example the surface active agent was the amine ester produced by the reaction between oleic acid and triethanolamine. These need not be incorporated separately in the pelletizing liquid, but may alternatively be added to the liquid in the combined ester form. It will also be understood that the foregoing examples are merely illustrative, and that the oleic acid-triethanolamine reaction product may be replaced entirely or in part by any dispersing agent consisting of the reaction product of an unsaturated fatty acid and a nitrogen base selected from the group of ammonia and amines, including specifically those amine esters listed above.

This application is a continuation of my pending application Serial No. 736,409 filed March 21, 1947, now abandoned.

Having thus disclosed my invention and described in detail certain illustrative embodiments thereof, I claim as new and desire to secure by Letters Patent:

1. A carbon black product in pelletized form, readily dispersible in news ink with high color development and having a levigation factor lower than 0.03 per cent and consisting essentially of carbon black intimately associated with oil, water and a surface active reagent which is an ester of an unsaturated fatty acid selected from the group consisting of ammonium oleate, ammonium linoleate, ethylenediamine linoleate, monoethylamine oleate, monoethanolamine oleate, morpholine eleostearate, morpholine oleate and triethanolamine oleate, the oil content of the pellets being between 15 and 60% and their total moisture content being between 5 and 35%.

2. A process for making carbon black pellets for use in news ink comprising agitating flocculent carbon black, adding to the black as it is being agitated an emulsion containing approximately 43% news ink vehicle, 54% water, 2% oleic acid and 1% triethanolamine, continuing the agitation until substantially dustless pellets are formed, removing these pellets from the agitator and drying them to moisture content of less than 35%.

3. A carbon black product in pelletized form, readily dispersible in news ink with high color development, consisting essentially of carbon black intimately associated with oil, water and a dispersing agent, said dispersing agent consisting of the reaction product of an unsaturated fatty acid and a nitrogen base selected from the group consisting of ammonia and amines, the oil content of the pellets being between 15 and 60 per cent and the total moisture content being between 5 and 35 per cent.

4. A process for making carbon black pellets for use in news ink with high color development and a low levigation factor, consisting of the following steps: agitating flocculent carbon black, adding to the black as it is being agitated an emulsion comprising oil, an emulsifying agent which is a reaction product of an unsaturated fatty acid and a nitrogen base selected from the group consisting of ammonia and amines, and water, continuing the agitation of the carbon black until substantially dustless pellets are formed, and drying the pellets to a moisture content of between 5 and 35 per cent, the oil of said emulsion being present in an amount sufficient to produce pellets having from 15 to 60 per cent oil when dried to said moisture content of from 5 to 35 per cent.

MERRILL E. JORDAN.

References Cited in the file of this patent

UNITED STATES PATENTS

| Number | Name | Date |
|---|---|---|
| 1,848,213 | Wiegand | Mar. 8, 1932 |
| 2,167,674 | Offutt | Aug. 1, 1939 |
| 2,427,238 | Swart | Sept. 9, 1947 |